(12) United States Patent
Liu et al.

(10) Patent No.: US 7,565,078 B2
(45) Date of Patent: Jul. 21, 2009

(54) THREAD STRUCTURE FOR AN OPTICAL LENS

(75) Inventors: Andy Liu, Taichung (TW); Michael Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 339 days.

(21) Appl. No.: 11/533,366

(22) Filed: Sep. 20, 2006

(65) Prior Publication Data
US 2007/0230949 A1 Oct. 4, 2007

(30) Foreign Application Priority Data
Apr. 3, 2006 (TW) ................ 95205587 U

(51) Int. Cl.
*G03B 17/00* (2006.01)
(52) U.S. Cl. ............ 396/533; 359/819; 411/413; 411/416; 411/417; 411/418; 411/422; 411/423
(58) Field of Classification Search ......... 396/534, 396/535, 533, 529; 411/378, 412, 413, 416, 411/417–423, 411; 403/359.6; 359/819
See application file for complete search history.

(56) References Cited

U.S. PATENT DOCUMENTS 6,483,101 B1 * 11/2002 Webster ............ 250/216
6,946,316 B2 * 9/2005 Glenn et al. .......... 438/64
6,979,144 B2 * 12/2005 Iwasaki ............. 403/359.6
7,444,073 B2 * 10/2008 Lee .................. 396/72
2002/0031078 A1 * 3/2002 Fukushima ......... 369/272
2004/0183936 A1 * 9/2004 Kim et al. .......... 348/340
2008/0012321 A1 * 1/2008 Roussie ............. 285/334

* cited by examiner

*Primary Examiner*—Christopher E Mahoney
*Assistant Examiner*—Linda B Smith
(74) *Attorney, Agent, or Firm*—Banger Shia

(57) ABSTRACT

A thread structure for an optical lens comprises a plastic lens barrel, and the thread structure is formed on an outer surface of the lens barrel. In each single circle of the thread structure there is a normal thread and a partial withdraw thread. The partial withdraw thread is located on a longitudinal parting line of the thread structure, a top diameter and a pitch circle diameter of the partial withdraw thread are smaller than those of the normal thread, the thread structure is provided with ribs that are located at the root of a first normal thread close to the front end of the lens barrel. The withdraw thread produces an interval between the thread structure and the base, thus preventing the burrs on the parting surface from contacting the inner threads of the base and causing powder.

9 Claims, 5 Drawing Sheets

THREAD STRUCTURE FOR AN OPTICAL LENS

BACKGROUND OF THE INVENTION

Field of the Invention

The present invention relates to a miniaturized lens used in a camera module of a mobile phone, and more particularly to an optical lens with a special thread structure, wherein an interval between the withdraw thread or the ribs of the thread structure of the optical lens and the base is used to reduce the powder generated in assembly of the plastic lens barrel or to solve the problem of blur image caused by the powder.

For a fixed focus camera module of an ordinary camera mobile phone, the lens barrel is usually made by plastic injection molding and provided with thread structure. When the optical lens is assembled to the base, the thread structure can be used to support the lens barrel, and the lens is focused by rotating the thread structure of the lens barrel. However, this structural design will cause the occurrence of powder in the camera module due to the following factors:

First, in order that the plastic lens barrel can be taken out of the mold after molding, a sliding block should be used in the mold to create such a thread structure. Therefore, a longitudinal parting line will be formed on the thread structure, there will be small burrs on the parting surface. When assembling the lens to the base, the burrs will impact each other and produce powder, and the powder will fall into the camera module.

Second, miniaturized module requires a fairly precise focusing control, normally, it requires certain amount of interference between the threads of the lens barrel and the threads of the base so as to prevent the shift of the lens (rendering out-of-focus) caused during transport, after focus is achieved. However, if the amount of interference is too great, the threads of the lens barrel and the base will rub against each other and give rise to powder.

The abovementioned problems in the optical lens of the conventional mobile phone are usually to be solved by improving the manufacturing process, namely, by improving the dimensional precision of the mold and reducing the surface roughness thereof, so as to reduce the burrs and the friction of the threads. Further, cleaning and wiping steps can be added to the manufacturing process so as to clean off the powder timely. However, this method cannot solve the problem of powder completely, but also increases the complexity and the cost of the manufacturing process.

The present invention has arisen to mitigate and/or obviate the afore-described disadvantages.

SUMMARY OF THE INVENTION

The primary objective of the present invention is to provide an optical lens that can prevent the threads of the lens barrel from producing powder.

To obtain the abovementioned objective, the present invention employs the following two methods to reduce the occurrence of powder and prevent the powder form falling into the camera module of the mobile phone.

Firstly, the present invention provides a structural design of withdraw thread. In each single circle of the thread structure there are two threads of different pitch circle diameters, one is a normal thread and the other is a partial withdraw thread. The thread structure is provided with two longitudinal parting lines. The partial withdraw thread is located on a longitudinal parting line of the thread structure, a top diameter of the partial withdraw thread is smaller than that of the normal thread, a pitch circle diameter of the partial withdraw thread is smaller than that of the normal thread, and a clearance surface is connected between the partial withdraw thread and an outer edge of the normal thread. By such arrangements, the withdraw thread can produce an interval between the thread structure and the base, and the interval prevents the burrs on the parting surface from contacting the inner threads of the base, thus reducing the amount of the powder generated in the assembly of the lens barrel.

Further, the partial withdraw thread can possess the following characteristics so as to make its function more perfect:

1. The interval between the normal thread and the partial withdraw thread is set to be equal to the difference between the pitch circle diameter of the normal thread and that of the partial withdraw thread. Since the thickness of the burrs on the longitudinal parting line caused by the sliding block (a mechanism for opening the mold) is about 0.02 mm, the interval can be set to be larger than 0.03 mm, so as to prevent the burrs from impacting and causing powder.

2. When the plastic lens barrel is made of plastic with high liquidity, such as LCP, PA, the resultant burr thickness will be increased to 0.05 mm, accordingly the interval can be set to be equal to or larger than 0.08 mm, so as to prevent the burrs from impacting and causing powder.

3. If the partial withdraw thread is too small, the powder is likely to be accumulated at the root of the thread and fall into the interior of the camera module, therefore, accordingly this problem can be prevented by setting the interval to be smaller than 0.7 times the pitch of thread.

4. To control the dimension of the products easily, a central axis of the normal thread and that of the partial withdraw thread can be set to be coaxial, the partial withdraw thread is formed on the partial decreasing thickness, and the size of the partial decreasing thickness is larger than 0.54 times a pitch of thread of the thread structure. The partial decreasing thickness is located at both sides of the longitudinal line, a draft angle is formed in a mold-opening direction, and the draft angle ranges from 0-10 degrees. By such arrangements, the stability on the product's dimension control can be improved.

The thread structure for an optical lens in accordance with the present invention is further provided with ribs which are located at the root of the first normal thread close to the front end of the lens barrel, and the number of the ribs is larger than 3, so that the withdraw thread can produce an interval between the thread structure and the base, thus reducing the area of interference between the threads of the lens barrel and those of the base and enabling the position of interference to be located away from the interior of the camera module. Such arrangements can reduce the powder caused by the friction of the threads and prevent the powder form falling into the interior of the camera module.

In addition, a difference between a top diameter of the ribs and a root diameter of the normal thread is set to be larger than 0.06 mm, so as to create a fixing force which is great enough to prevent the shift of the lens (rendering out-of-focus) caused by transport after focus is achieved.

DETAILED DESCRIPTION OF THE PREFERRED EMBODIMENTS

The present invention will be more clear from the following description when viewed together with the accompanying drawings, which show, for purpose of illustrations only, the preferred embodiment in accordance with the present invention.

Figure 1:
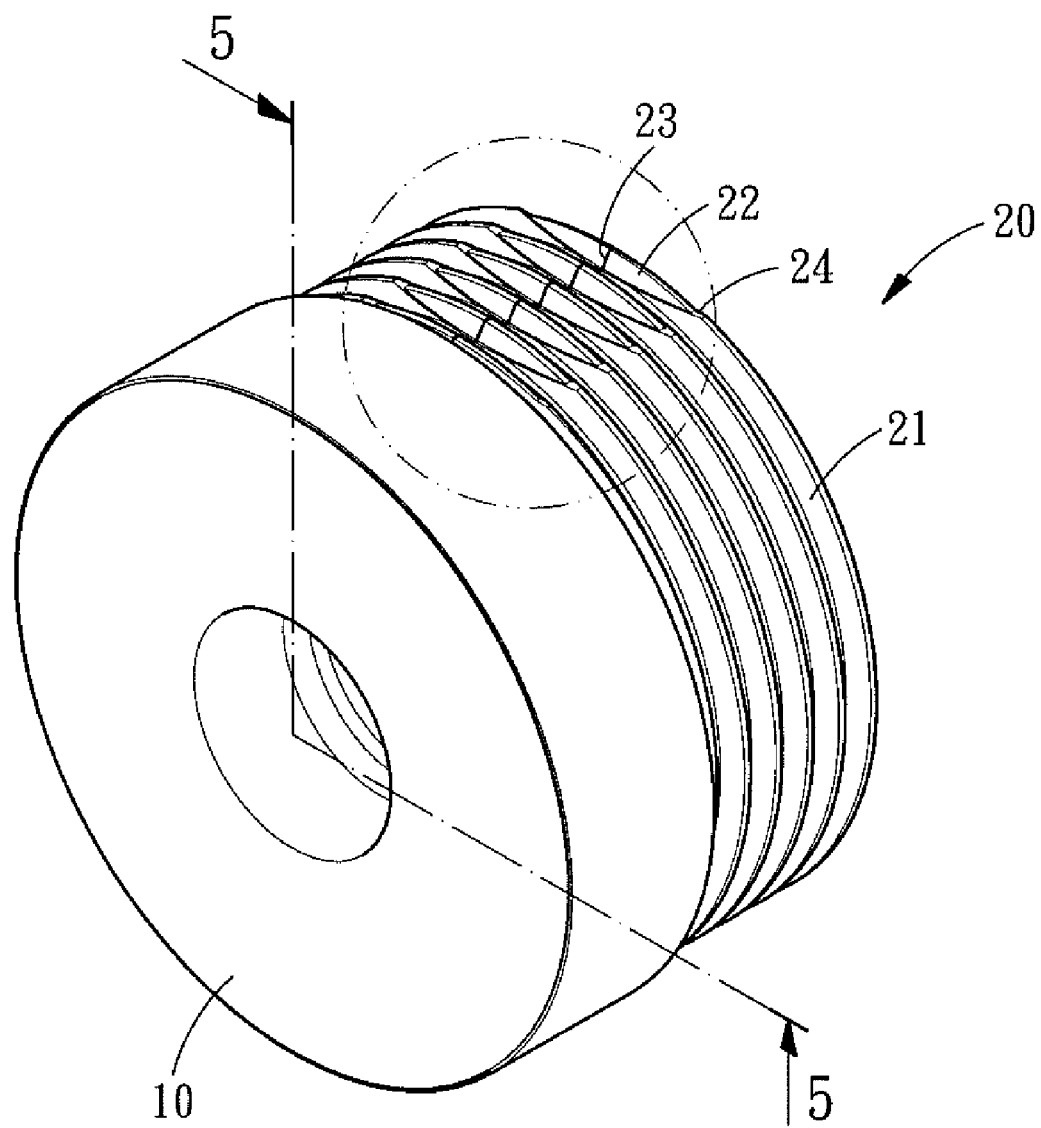
FIG. 1 is a perspective view of a thread structure for an optical lens in accordance with a first embodiment of the present invention.
Figure 2:
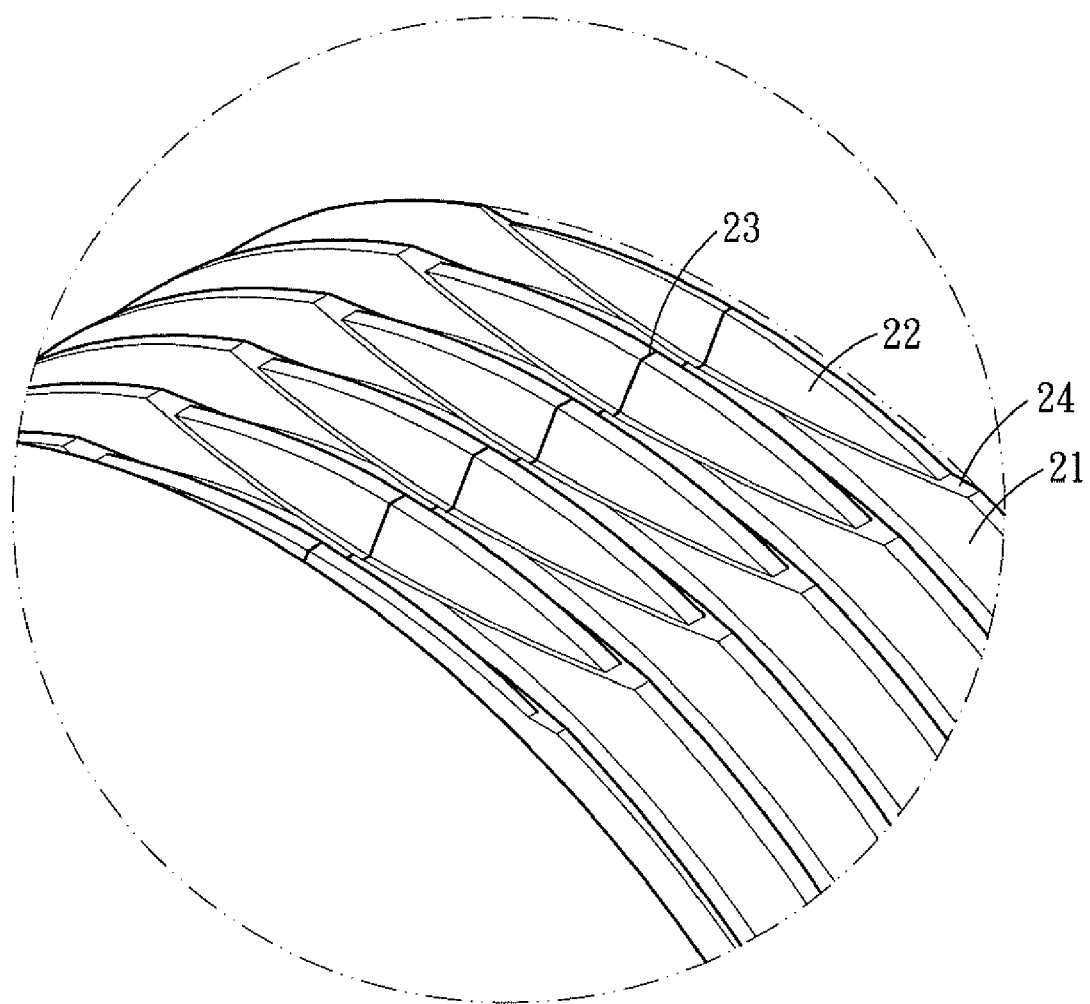
FIG. 2 is an enlarged view of a part of FIG. 1.

FIG. 1 shows a thread structure for an optical lens in accordance with a first embodiment of the present invention, and FIG. 2 is an amplified view of a part of FIG. 1.

An optical lens 10, the lens barrel of which is made of plastic material, and a thread structure 20 is formed on the outer surface of the lens barrel. In each single circle of the thread structure 20 there are two threads of different pitch circle diameters, one is a normal thread 21 and the other is a partial withdraw thread 22. The partial withdraw thread 22 is located on the longitudinal parting line 23 of the thread structure of the lens barrel, and a clearance surface 24 is connected between the partial withdraw thread 22 and the outer edge of the normal thread 21.

The size of the normal thread is M7×P 0.35, top diameter: 6.95 mm, pitch circle diameter: 6.773 mm, root diameter: 6.55 mm, pitch of thread: 0.35.

The size of the partial withdraw thread: top diameter: 6.85 mm, pitch circle diameter: 6.673 mm, root diameter: 6.55 mm.

The central axis of the normal thread 21 and that of the partial withdraw thread 22 are coaxial, the difference between the pitch circle diameter of the normal thread 21 and that of the partial withdraw thread 22 is set to be an interval between the normal thread and the partial withdraw thread, and the interval is 0.1 mm.

Figure 3:
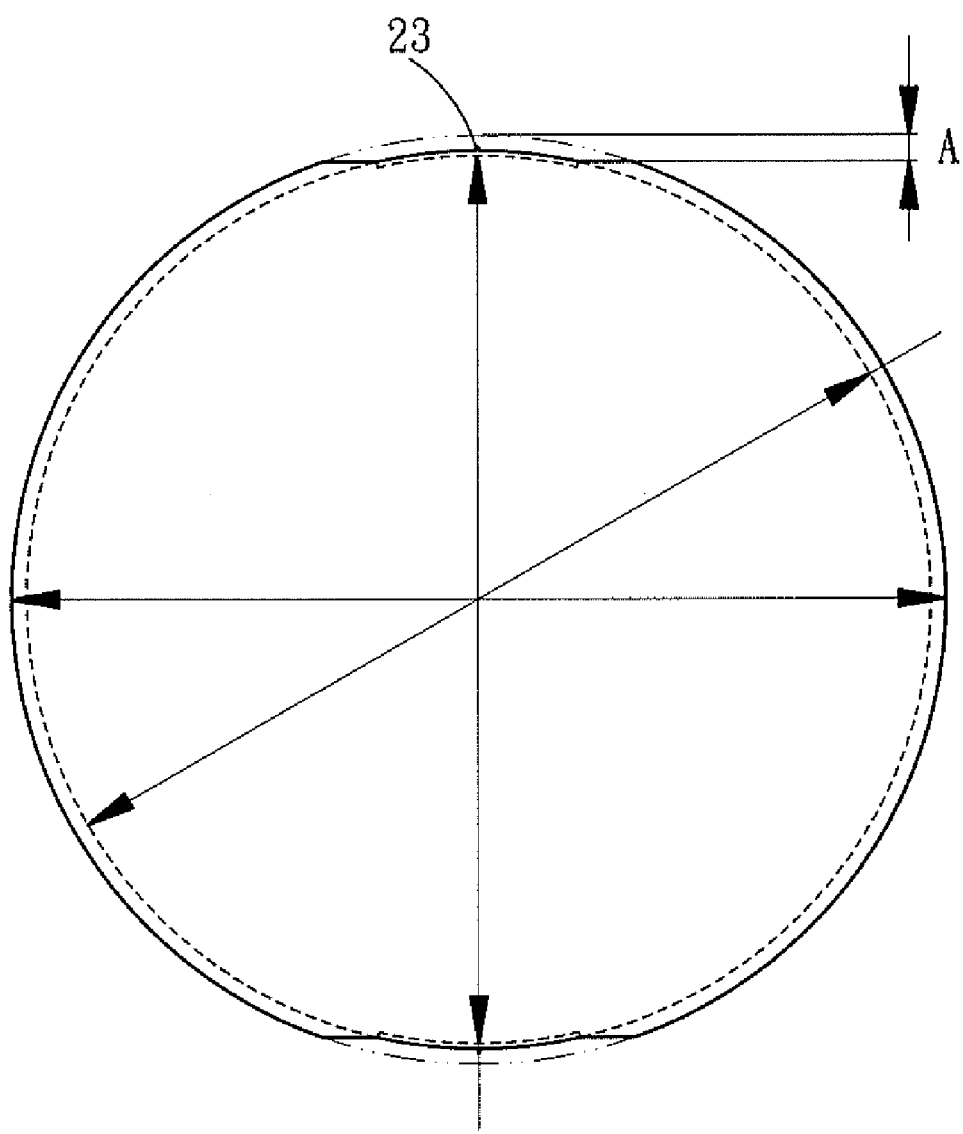
FIG. 3 is a projection view in accordance with a first embodiment of the present invention of showing the profile of the thread structure along the axis thereof.

Therefore, the pitch of thread times 0.7 is 0.245 mm, the interval is smaller than this value. FIG. 3 is a projection view of the profile of the thread structure along the axis thereof, wherein the two partial withdraw threads 22 are located on the longitudinal parting lines at two opposite sides of the lens barrel.

The lens barrel is formed in its outer surface with partial decreasing thickness A. The size of the decreasing thickness is the distance between the top of the normal thread 21 and the decreasing thickness A in the direction of the longitudinal parting line, namely, the portion designated by A in FIG. 3.

The size of the partial decreasing thickness A is set to be 0.25 mm, pitch of thread times 0.54 is 0.189 mm, and the partial decreasing thickness A is larger than this value.

In addition, the partial decreasing thickness A is located on both sides of the longitudinal parting surface, a draft angle can be formed in the mold-opening direction, and the draft angle is 5 degrees.

Figure 4:
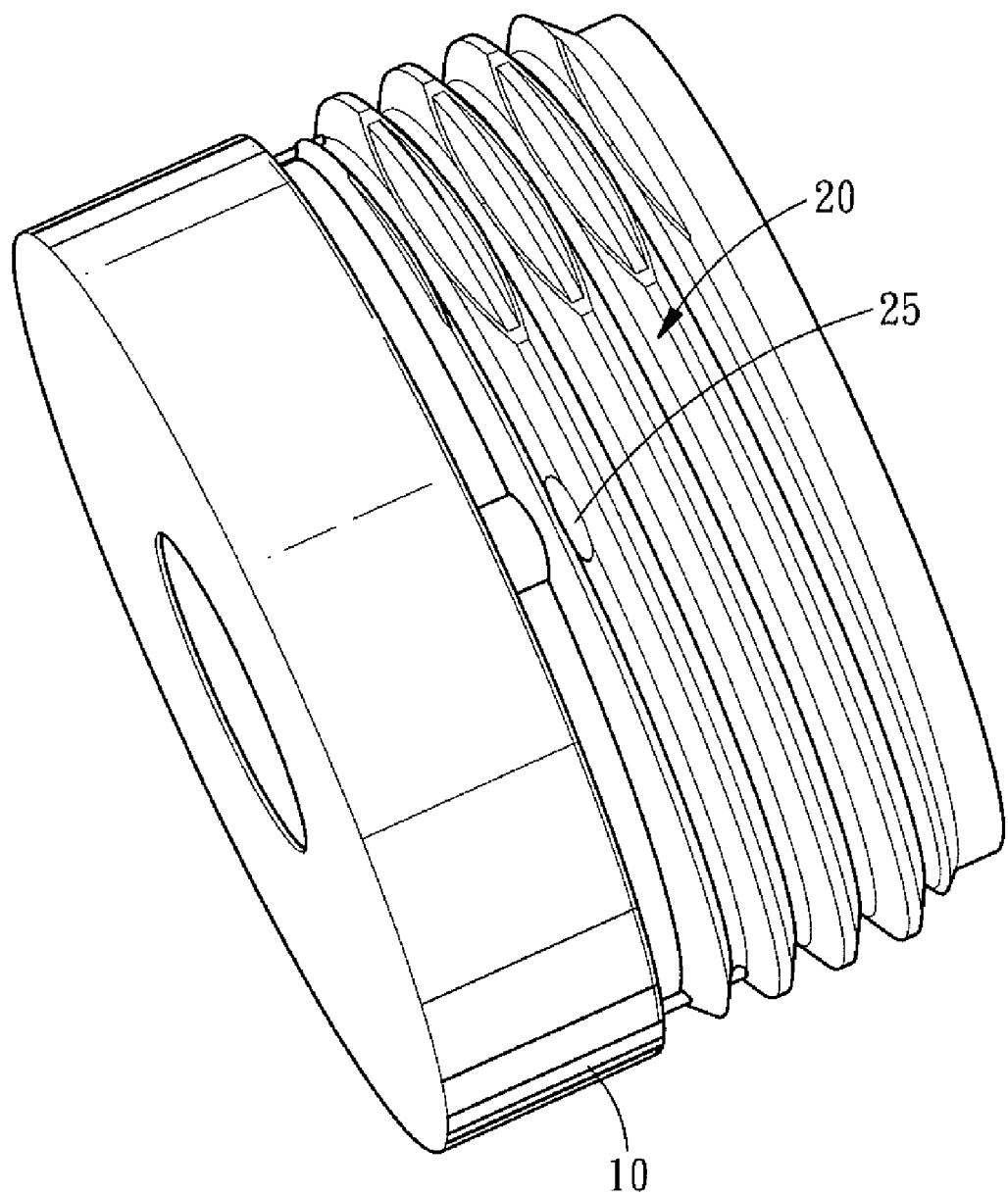
FIG. 4 is a perspective view of a thread structure for an optical lens in accordance with a second embodiment of the present invention.
Figure 5:
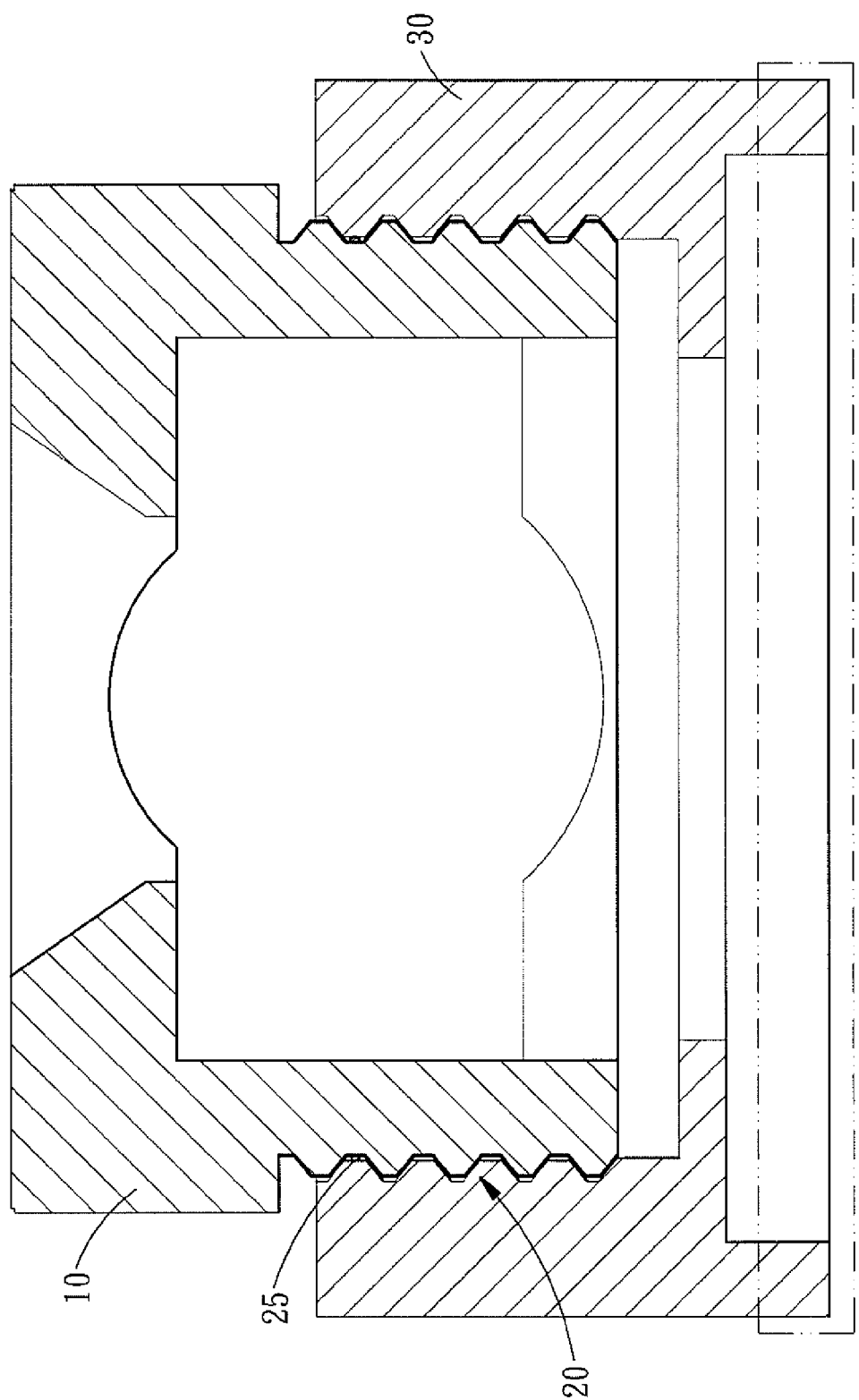
FIG. 5 is a cross sectional view of the thread structure for an optical lens in accordance with the second embodiment of the present invention.

FIGS. 4 and 5 show a second embodiment of the present invention, wherein the optical lens barrel is made of plastic material and is formed on its outer surface with a thread structure 20. In each single circle of the thread structure 20 there are two threads of different pitch circle diameters, one is a normal thread 21 and the other is a partial withdraw thread 22. The lens barrel is formed with two longitudinal parting lines 23, and the partial withdraw thread 22 is located on the longitudinal parting lines 23 of the thread structure of the lens barrel. The partial withdraw thread 22 and the normal thread 21 are coaxial, and a clearance surface 24 is connected between the partial withdraw thread 22 and the outer edge of the normal thread 21. The thread structure 20 is provided with four ribs 25 that are located at the root of the first normal thread close to the front end of the lens barrel. The top diameter, the root diameter and the pitch circle diameter of the normal thread 21 and the partial withdraw thread 22 in this embodiment are the same as those in the first embodiment.

The top diameter of the ribs 25 is 6.70 mm, and the difference of the top diameter of the ribs 25 with respect to that of the normal thread 21 is 0.15 mm.

The thread structure 20 on the barrel of the optical lens 10 is meshed with the base 30, and the ribs 25 at the root of the first normal thread close the front end of the lens barrel can be sued to reduce the powder caused by the friction between the burrs on the parting surface and the thread structure 20.

To summarize, the present invention employs an interval between the withdraw thread or the ribs of the thread structure of the optical lens and the base to reduce the powder caused by the friction between the burrs on the parting surface and the thread structure. Therefore, the industrial value of the present invention is proven beyond all doubt.

While we have shown and described various embodiments in accordance with the present invention, it is clear to those skilled in the art that further embodiments may be made without departing from the scope of the present invention.

What is claimed is:

1. A thread structure for an optical lens comprising a plastic lens barrel, and the thread structure being formed on an outer surface of the lens barrel, wherein in each single circle of the thread structure there are two threads of different pitch circle diameters, one is a normal thread and the other is a partial withdraw thread;

the partial withdraw thread is located on a longitudinal parting line of the thread structure, a top diameter of the partial withdraw thread is smaller than that of the normal thread, a pitch circle diameter of the partial withdraw thread is smaller than that of the normal thread, and a clearance surface is connected between the partial withdraw thread and an outer edge of the normal thread.

2. The thread structure for an optical lens as claimed in claim 1, wherein the difference between the pitch circle diameter of the normal thread and that of the partial withdraw thread is defined as an interval between the normal thread and the partial withdraw thread, and the interval is larger than 0.03 mm.

3. The thread structure for an optical lens as claimed in claim 1, wherein the interval is smaller than 0.7 times a pitch of thread of the thread structure, and the interval $\geqq 0.08$ mm.

4. The thread structure for an optical lens as claimed in claim 1, wherein the lens barrel is formed in its outer surface with partial decreasing thickness in which the partial withdraw thread being formed, and the size of the partial decreasing thickness is larger than 0.54 times a pitch of thread of the thread structure.

5. The thread structure for an optical lens as claimed in claim 4, wherein the partial decreasing thickness is located at both sides of the longitudinal line, a draft angle is formed in a mold-opening direction, and the draft angle ranges from 0-10 degrees.

6. The thread structure for an optical lens as claimed in claim 1, wherein a central axis of the normal thread and that of the partial withdraw thread are coaxial.

7. The thread structure for an optical lens as claimed in claim 1, wherein the thread structure is provided with two longitudinal parting lines.

8. A thread structure for an optical lens comprising a plastic lens barrel, and the thread structure being formed on an outer surface of the lens barrel, wherein the thread structure is provided with ribs that are located at the root of a first normal thread close to the front end of the lens barrel;

in each single circle of the thread structure there are two threads of different pitch circle diameters, one is a normal thread and the other is a partial withdraw thread;

the thread structure is provided with two longitudinal parting lines;

the partial withdraw thread is located on a longitudinal parting line of the thread structure, a central axis of the normal thread and that of the partial withdraw thread are coaxial, a top diameter of the partial withdraw thread is smaller than that of the normal thread, a pitch circle diameter of the partial withdraw thread is smaller than that of the normal thread, and a clearance surface is connected between the partial withdraw thread and an outer edge of the normal thread.

9. The thread structure for an optical lens as claimed in claim 8, wherein the number of the ribs is equal to or larger than 3, and a difference between a top diameter of the ribs and a root diameter of the normal thread is larger than 0.06 mm.

* * * * *